Patented May 1, 1923.

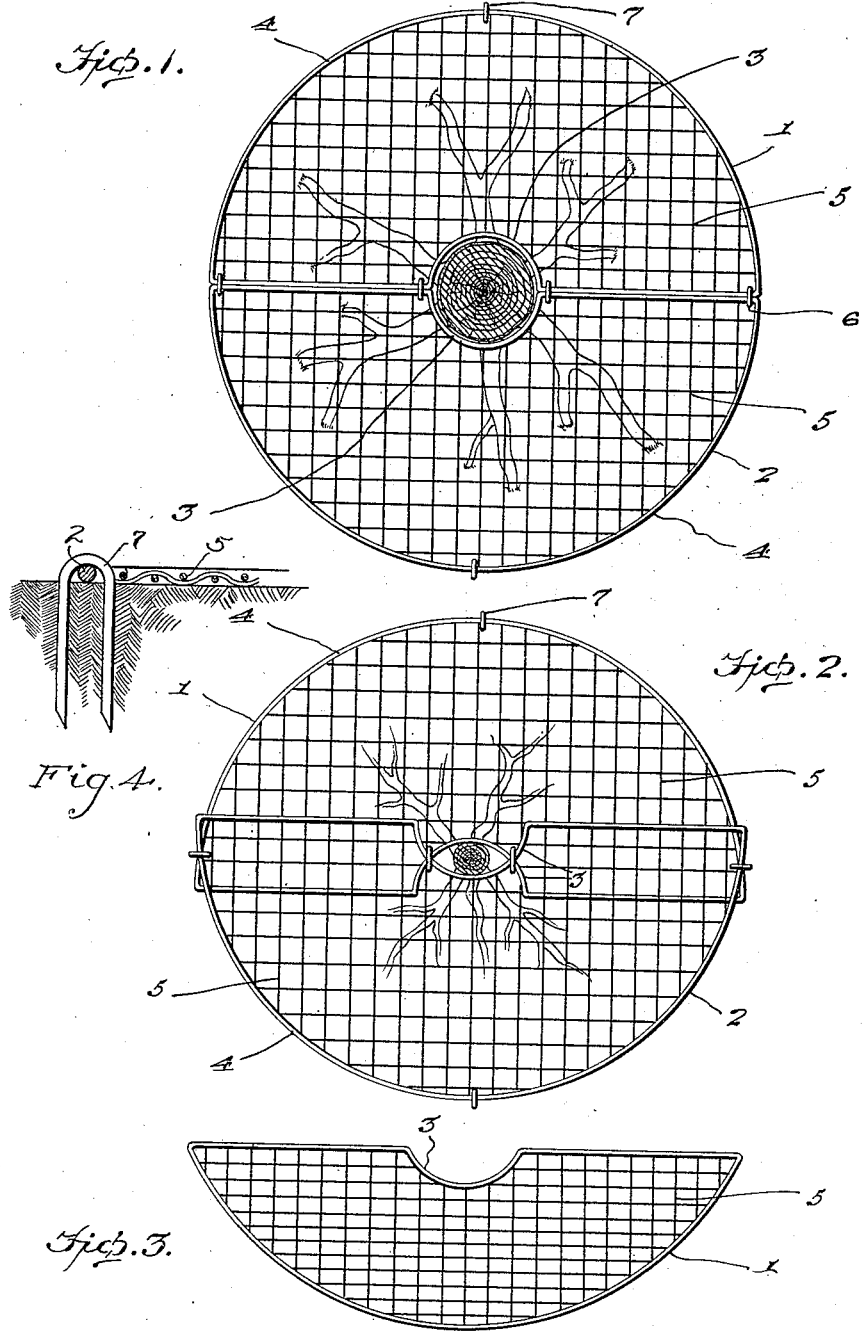

1,453,810

UNITED STATES PATENT OFFICE.

OTTO SLEEN, OF ROCKY MOUNTAIN HOUSE, ALBERTA, CANADA.

TREE PROTECTOR.

Application filed April 15, 1922. Serial No. 552,883.

*To all whom it may concern:*

Be it known that I, OTTO SLEEN, a subject of the King of Great Britain, residing at Rocky Mountain House, in the Province of Alberta and Dominion of Canada, have invented new and useful Improvements in Tree Protectors, of which the following is a specification.

My present invention has reference to a device for protecting the lower parts of the trunks of trees.

The object of the invention is to provide a device of this character which shall be of an extremely simple construction, cheaply manufactured and marketed, adjustable to fit trees of different sizes and having means which enter the ground for holding the same in operative position.

The foregoing, and other objects which will appear as the nature of the invention is better understood, may be accomplished by a construction, combination and operative association of parts, such as is disclosed by the drawings which accompany and which form part of this specification.

In the drawing:—

Figure 1 is a view illustrating the application of the improvement.

Figure 2 is a plan view illustrating the sections adjusted to fit the trunk of a small tree.

Figure 3 is a perspective view of one of the protector sections looking toward the under face thereof.

Figure 4 is an enlarged fragmentary sectional view on the line 4—4 of Figure 1.

Valuable trees, especially when young, have been seriously damaged by poultry and animals scratching the ground at the trunks thereof and thereby exposing the roots. Also, such trees have been damaged by being contacted by a mower when the grass is cut therearound. As my improvement surrounds the trunk of the tree and is arranged over a considerable area of earth adjacent to the trunk, the digging of the earth therearound by fowls or animals and the contact of the trunk by mowers will be effectively prevented.

My improvement comprises opposed flat semi-circular members 1 and 2 respectively, each of the same size and construction. Each of the members 1 and 2 has its straight edge centrally provided with a rounded notch 3, the notches receiving therein the trunk of the tree.

Preferably, each of the sections 1 and 2 has its outer edge formed from a single strand of wire 4, while secured to the wire frames 4, in any desired or preferred manner is the body portion 5 of the protector. The body 5 may be in the nature of a closely woven wire mesh, or may be in the nature of a heavy fabric which is sufficiently porous to allow the air to pass therethrough and enter the ground around the tree. The frame 4 of each of the sections 1 and 2 has its outer rounded portion at its juncture with its inner straight edge provided with downwardly extending elements 6 that are designed to enter the ground, and its said rounded portion, at other desired intervals provided with similar ground entering elements 7.

When the device is arranged around the trunks of large trees, the straight edges of the flat semi-circular sections are in contacting engagement, but when arranged on the ground around the trunks of smaller trees, the straight edge of one of the sections is disposed in overlying or lapping relation with respect to the other section. Either of such arrangements does not interfere with the element 6 being forced into the ground. The elements 6 and 7 are, of course, of a length not sufficient to contact with the roots of the tree and thereby impart injury to the tree.

It is thought that the foregoing description, when taken in connection with the drawings will fully set forth the construction and advantages of the improvement to those skilled in the art to which such inventions relate.

Having described the invention, I claim:—

1. A tree protector designed to be arranged on the ground at the opposite sides of the trunk of a tree comprising two flat semi-circular members each having a semi-circular notch centrally of its straight edge to receive the trunk of a tree therein and the rounded edges of each of the members having ground entering elements.

2. A tree protector designed to be arranged on the ground to the opposite sides of the trunk of a tree comprising a pair of flat semi-circular members, the outer edges of which being formed from a strand of wire and the wire, at the straight edge of the members being centrally rounded inwardly to receive the trunk of a tree and to permit of the members having their straight edge portions disposed in lapping relation in accordance with the thickness of the trunk, a foraminous facing secured to the wire frame of each of the members, and the rounded portion of the frame of each of the members having ground entering elements thereon.

In testimony whereof I affix my signature.

OTTO SLEEN.